(12) United States Patent
Lee et al.

(10) Patent No.: US 10,882,547 B2
(45) Date of Patent: Jan. 5, 2021

(54) INTEGRAL TYPE DUST COVER WITH BEARINGS

(71) Applicant: DMC, INC, Seongnam-si (KR)

(72) Inventors: Jae Won Lee, Daegu (KR); Hyung Joon Kim, Seoul (KR)

(73) Assignee: DMC, INC, Seongnam-si (KR)

( * ) Notice: Subject to any disclaimer, the term of this patent is extended or adjusted under 35 U.S.C. 154(b) by 0 days.

(21) Appl. No.: 16/344,806

(22) PCT Filed: Jan. 6, 2017

(86) PCT No.: PCT/KR2017/000181
§ 371 (c)(1),
(2) Date: Apr. 25, 2019

(87) PCT Pub. No.: WO2018/110764
PCT Pub. Date: Jun. 21, 2018

(65) Prior Publication Data
US 2020/0055537 A1    Feb. 20, 2020

(30) Foreign Application Priority Data
Dec. 13, 2016    (KR) .................. 10-2016-0169587

(51) Int. Cl.
*B62D 1/16*     (2006.01)
*B62D 25/14*    (2006.01)
(Continued)

(52) U.S. Cl.
CPC .............. *B62D 1/16* (2013.01); *B62D 25/14* (2013.01); *B60R 13/0846* (2013.01);
(Continued)

(58) Field of Classification Search
CPC ....... B62D 1/16; B62D 25/14; B60R 13/0846; F16C 33/72; F16C 2208/78; F16J 15/54
See application file for complete search history.

(56) References Cited

U.S. PATENT DOCUMENTS

| 4,817,964 A | 4/1989 | Black, Jr. |
| 2008/0231003 A1 | 9/2008 | Moriyama et al. |

(Continued)

FOREIGN PATENT DOCUMENTS

| JP | 10-129507 A | 5/1998 |
| JP | 11-132328 A | 5/1999 |
| KR | 10-1609142 B1 | 4/2016 |

OTHER PUBLICATIONS

International Search Report for PCT/KR2017/000181 dated Aug. 25, 2017 from Korean Intellectual Property Office.

*Primary Examiner* — Luis A Gonzalez
(74) *Attorney, Agent, or Firm* — Revolution IP, PLLC

(57) ABSTRACT

The present invention provides a dust cover which is provided between an engine room and the driver's seat such that, when a steering shaft provided under a steering wheel of a vehicle is installed passing through a vehicle frame, the steering shaft passes through the dust cover. The dust cover is characterized by comprising: a pair of bearings coupled to the steering shaft; a pair of bearing races provided to surround outer circumferential surfaces of the bearings; a ring-shaped fixing cap forcibly inserted into the bearing races through both sides of an opening by interference fitting, thereby fixing the bearings; and an integrally formed seal part having through-holes to which the bearing races are coupled.

6 Claims, 7 Drawing Sheets

(51) Int. Cl.
*B60R 13/08* (2006.01)
*F16C 33/72* (2006.01)
*F16J 15/54* (2006.01)

(52) U.S. Cl.
CPC .......... *F16C 33/72* (2013.01); *F16C 2208/78* (2013.01); *F16J 15/54* (2013.01)

(56) References Cited

U.S. PATENT DOCUMENTS

2015/0054231 A1* 2/2015 Lichtenberg ............. B62D 1/16
                                                            277/636
2017/0146129 A1* 5/2017 Allen .................... F16J 15/3224
2017/0219100 A1* 8/2017 Kobayashi ........... F16J 15/3224

* cited by examiner

US 10,882,547 B2

INTEGRAL TYPE DUST COVER WITH BEARINGS

TECHNICAL FIELD

The present disclosure relates to a dust cover for a vehicle steering device and, more specifically, to an integral type dust cover with bearings, which reduces the noise and foreign matters entering the vehicle interior from an engine room and facilitates the rotation of a steering shaft.

BACKGROUND ART

In general, the interior of a vehicle is equipped with devices of various types and shapes so that a driver can drive the vehicle.

Among these devices, an accelerator pedal and a brake pedal for adjusting the running speed of the vehicle and a steering wheel that is a steering device for adjusting the running direction of the vehicle are installed inside the vehicle by passing through the dash panel provided between an engine room and the interior of the vehicle.

In particular, the steering device is operated as a driver turns the steering wheel installed in the vehicle interior, wherein as the driver turns the steering wheel, the steering lower shaft installed at the lower portion of the steering wheel rotates together with the steering wheel, thereby changing the direction of the vehicle.

Herein, the steering wheel, which is the steering device for adjusting the running direction of the vehicle, is installed in the interior of the vehicle through the dash panel 2 provided between the engine room and the interior of the vehicle.

In addition, the steering shaft is installed at one side of the dash panel that divides the interior of the vehicle and the engine room, wherein the steering shaft is installed maintaining a certain space with respect to the dash panel since the steering shaft rotates according to the operation of the driver.

In addition, since the dash panel is installed between the engine room and the interior space of the vehicle, a dust cover is installed between the steering shaft and the dash panel in order to prevent the noise and foreign matters in the engine room from entering the interior space through the gap of the steering lower shaft installed in the dash panel.

According to the prior art disclosed in Korean Reg. Patent No. 10-1609142, a dust cover includes an outer seal 140 and an inner seal 130, which are respectively provided at the engine room side and interior space side of a vehicle with respect to a dash panel and coupled by means of fastening members so as to be integrally formed and serve to prevent noise and foreign matters from entering the interior space from the engine room.

Herein, the dust cover includes an outer cover 150 for surrounding and protecting the outer seal 140 and a bearing 110 provided for facilitating the rotation of a steering shaft.

However, the bearing 110 is deformed in shape by the assembly method, in which the bearing 110 is press-fitted into a bearing housing 120 and a gap is formed between the bearing housing 120 and the bearing 110 due to such a deformation.

Therefore, there is the problem that noise and foreign matters flow into the interior space through the gap.

In addition, the dust cover has the problem that since the dust cover is assembled including the three members of the inner seal 130, the outer seal 140 and the outer cover 150, it is likely that a gap is formed between the dust cover and the dash panel during assembling, resulting in the assembly failure.

PRIOR ART DOCUMENT

Patent Document (Patent Document 1) Korean Reg. Patent No. 10-1609142

DISCLOSURE

Problem to be Solved

Accordingly, the present disclosure has been made in an effort to solve the above-mentioned problems, and it is an objective of the present disclosure to provide an integral type dust cover with bearings, which can improve assembly and effectively block noise and foreign matters.

However, the objective of the present disclosure is not limited to the above-mentioned objective, and further objectives which are not mentioned can be clearly understood by those skilled in the art from the following description.

Technical Solution

In order to achieve the objective, the present disclosure provides a dust cover, through which a steering shaft passes when the steering shaft provided under the steering wheel of a vehicle is installed through a vehicle frame, characterized in that the dust cover includes a rolling part 100 coupled to the steering shaft S and a seal part 200 provided in a gap between the dash panel of the vehicle frame and the steering shaft S, the seal part 200 includes a plate 230 forming the bottom, an upper protrusion part 210 protruding upward in a conical shape on the upper surface of the plate 230, and a lower protrusion part 220 protruding downward in a conical shape on the lower surface of the plate 230, and a through-hole 270, to which the rolling part 100 is coupled, is disposed in each of the upper protrusion part 210 and the lower protrusion part 220.

In addition, the seal part 200 is characterized in that a long portion 211 having a long length is formed on the inclined surface of the upper protrusion part 210, a long portion 221 having a long length is formed on the inclined surface of the lower protrusion part 220, the long portion 211 of the upper protrusion part 210 and the long portion 221 of the lower protrusion part 220 are provided to face each other, the long portions 211, 221 have annular wrinkle parts 212, 222 formed to be concave or formed to convexly project, and the inside of the upper protrusion part 210 and the lower protrusion part 220 is empty.

In addition, the seal part 200 includes a side wall part 240 protruding upward along the circumference of the plate 230, a flange wing part 250 extending outward from an upper end of the side wall part 240 so as to be placed on the dash panel of the vehicle frame, and an impact mitigation gap 280 formed between the upper protrusion part 210 and the side wall part 240.

In addition, a protrusion pin 260 protruding from the long portion 221 of the lower protrusion part 220 so as to face the outer circumferential surface of the long portion 221 and the seal part 200 is formed integrally.

Meanwhile, the rolling part 100 includes one pair of bearings 110 coupled to the steering shaft S, one pair of bearing races 120 provided to surround the outer circumferential surfaces of the bearings 110, and ring-shaped fixing caps 130 provided on the bearing race 120 so as to fix the bearings 110.

In addition, the fixing caps 130 are forcedly inserted into the bearing race 120 through the both sides of an opening by interference fitting so as to fix the bearings 110.

In addition, the bearing race 120 has inner stepped portions 124-1 formed on the inner circumferential surface 124 of the bearing race 120 such that the one pair of bearings 110 are provided on the inner stepped portions 124-1, and the inner stepped portions 124-1 are formed to be vertically symmetrical with respect to the horizontal center axis c of the bearing race 120 and the inner stepped portions 124-1 are respectively formed at the upper side and the lower side with respect to the horizontal center axis c.

The features and advantages of the present disclosure will become more apparent from the following detailed description based on the accompanying drawings.

Prior to the description, the terms and wordings used in the specification and the claims should not be construed to be limited to general and lexical meanings and should be construed as meanings and concepts corresponding with the technical spirit of the present disclosure based on a principle that the inventor can suitably define the concepts of the terms to describe his or her disclosure in the best way.

Advantageous Effects

As described above, according to the present disclosure, there are effects that assembly is facilitated and it is possible to prevent noise, foreign matters, and corrosive matters generated in the engine room from entering the vehicle interior.

DETAILED DESCRIPTION OF THE DISCLOSURE

Figure 1:
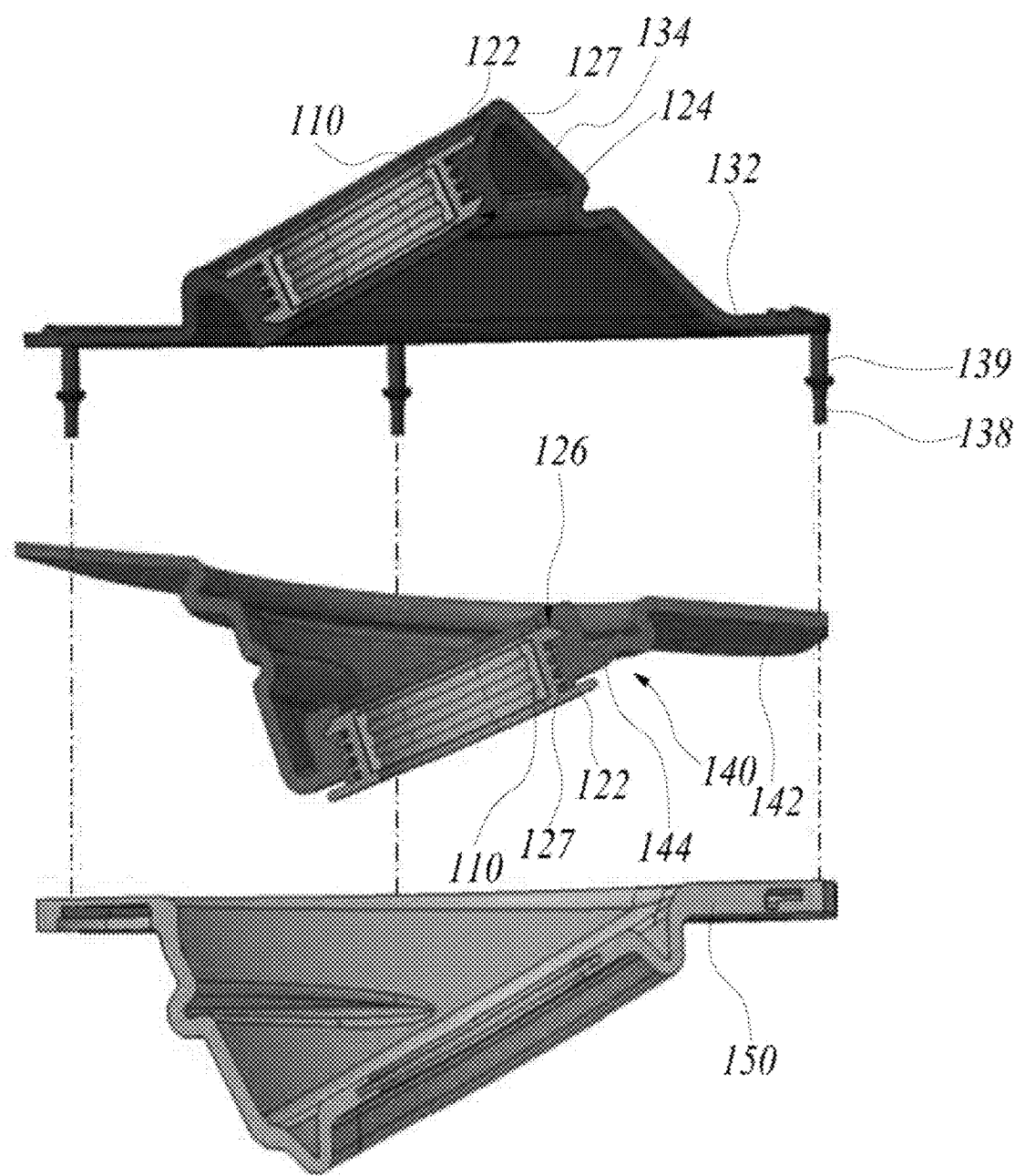
FIG. 1 is an exploded cross-sectional view of a prior art steering shaft fixing bearing structure.

Hereinafter, preferred embodiments of the present disclosure will be described with reference to the accompanying drawings for it to be readily carried out by a person skilled in the art.

Preferred embodiments of the present disclosure will now be described with reference to the accompanying drawings. In this process, the thicknesses of lines, the sizes of the components and the like shown in the drawings may be exaggerated for the sake of clarity and convenience of explanation.

In addition, the terms described hereinafter are defined in consideration of the functions in the present disclosure, which may vary depending on the intention of a user or an operator or practice. Therefore, definitions of these terms should be made based on the contents throughout the specification.

In addition, the following embodiments are not intended to limit the scope of the present disclosure, but merely as exemplifications of the components set forth in the claims of the present disclosure, and are included in technical ideas throughout the specification of the present disclosure, and embodiments that include components that are replaceable as equivalents in the components of the scope may be included in the scope of the present disclosure.

Figure 2:
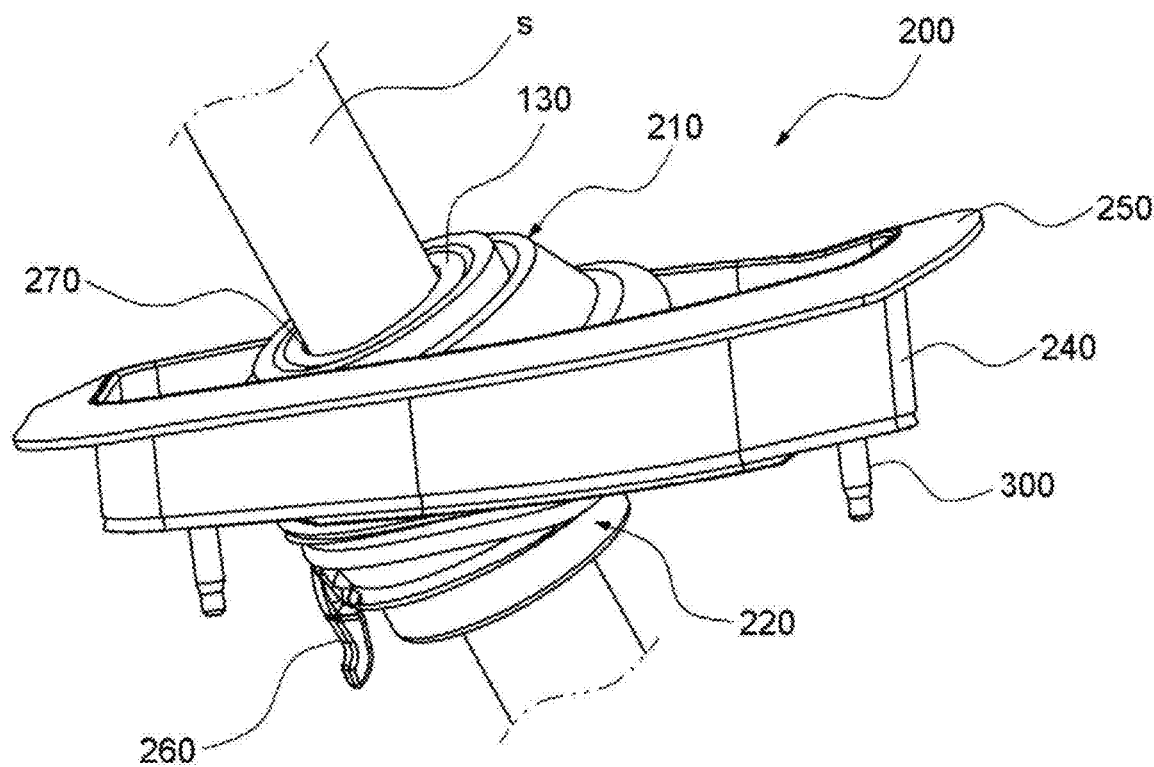
FIG. 2 is a perspective view showing a dust cover according to a preferred embodiment of the present disclosure.
Figure 3:
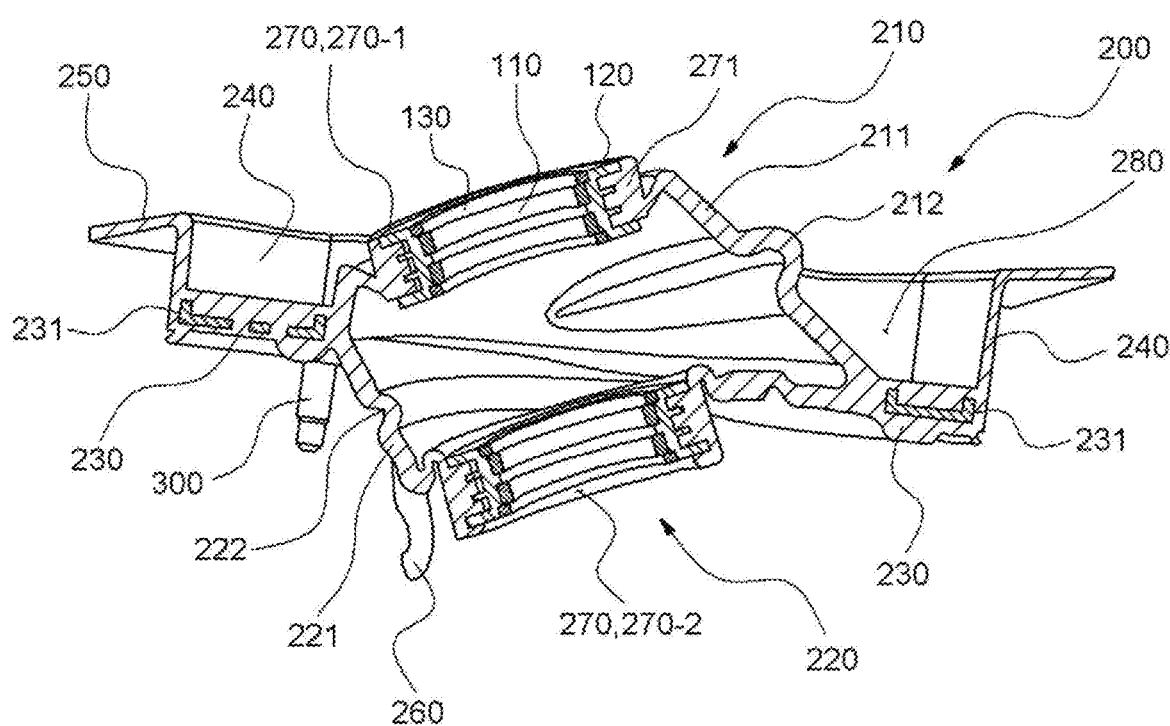
FIG. 3 is a cross-sectional view showing the dust cover according to a preferred embodiment of the present disclosure.
Figure 4:
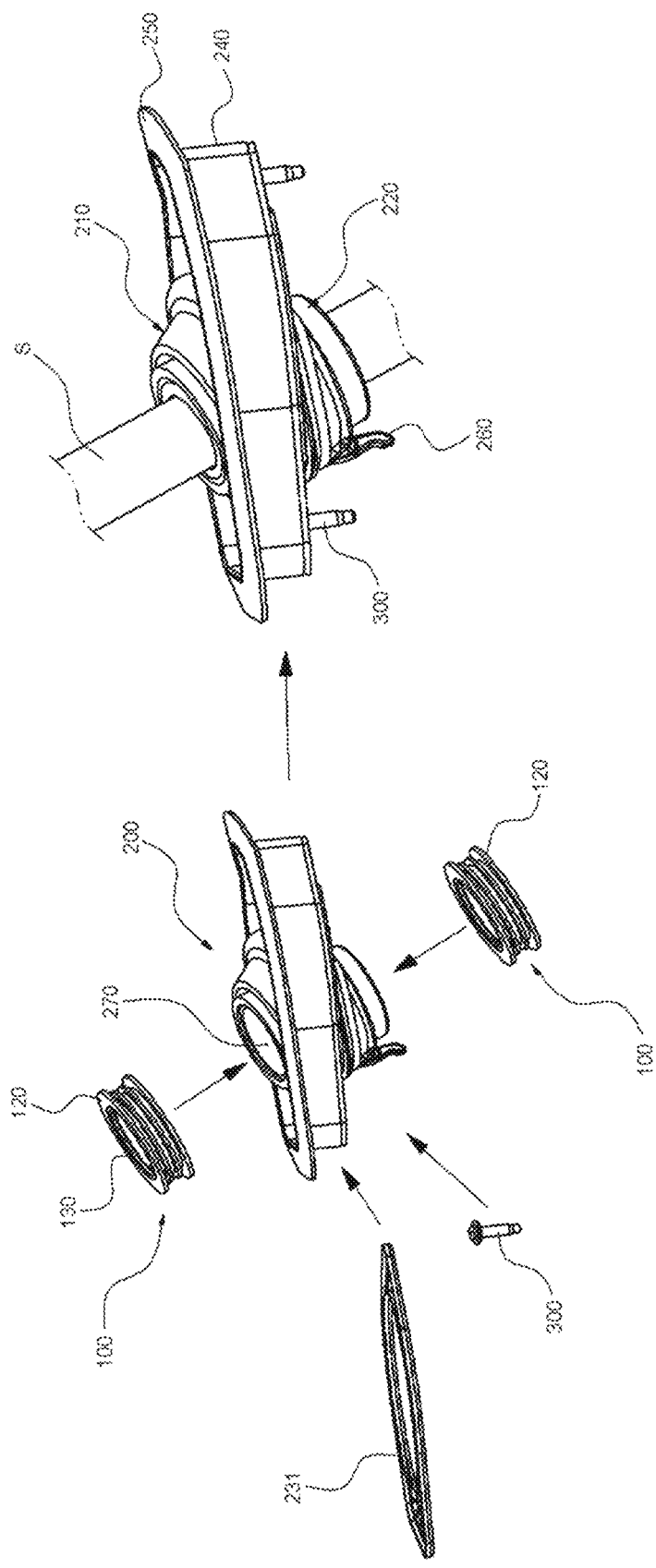
FIG. 4 is a view showing the coupling of a dust cover according to a preferred embodiment of the present disclosure.
Figure 5:
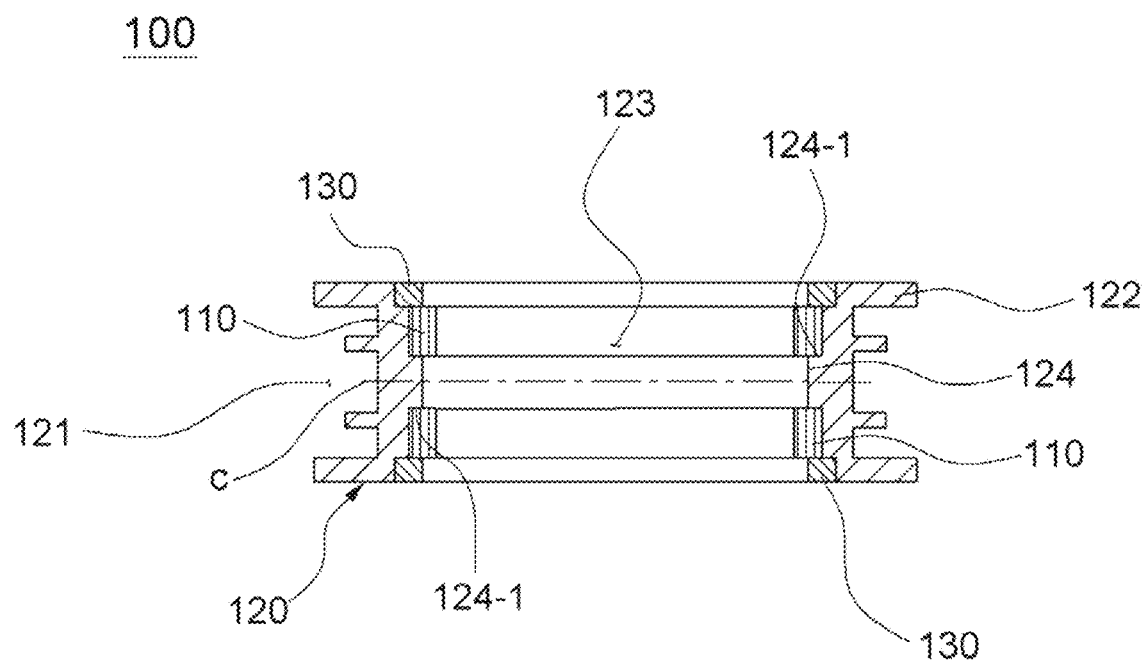
FIG. 5 is a cross-sectional view of a bearing race according to a preferred embodiment of the present disclosure.
Figure 6:
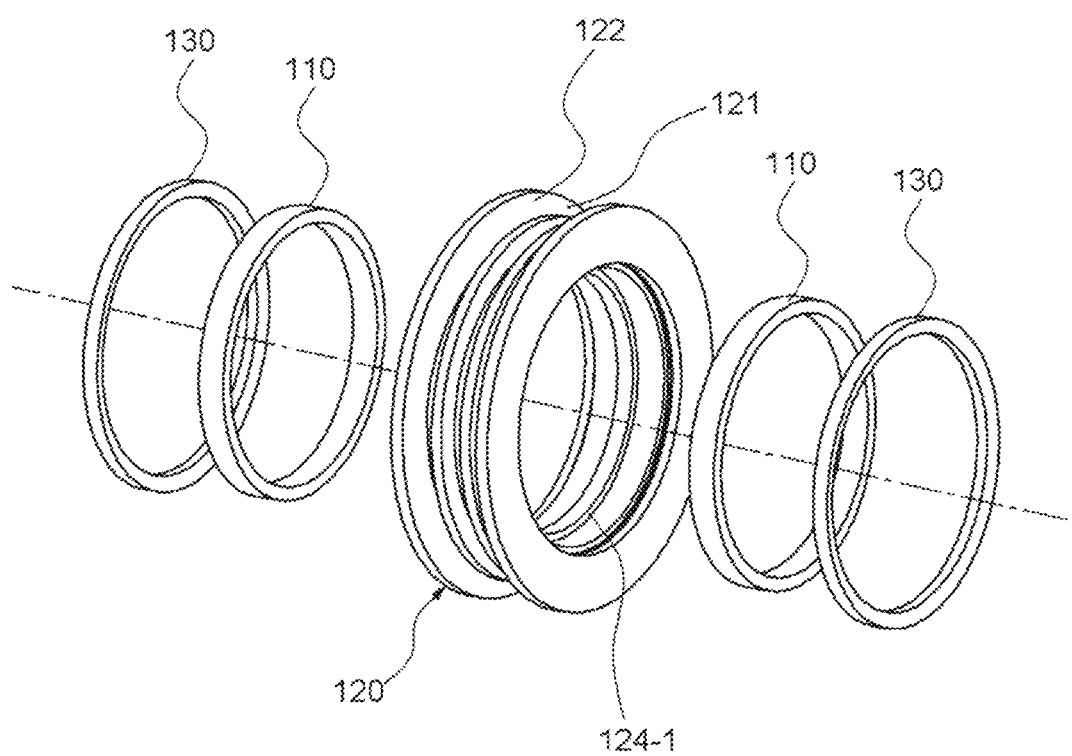
FIG. 6 is a view showing the coupling of the bearing race according to a preferred embodiment of the present disclosure.
Figure 7:
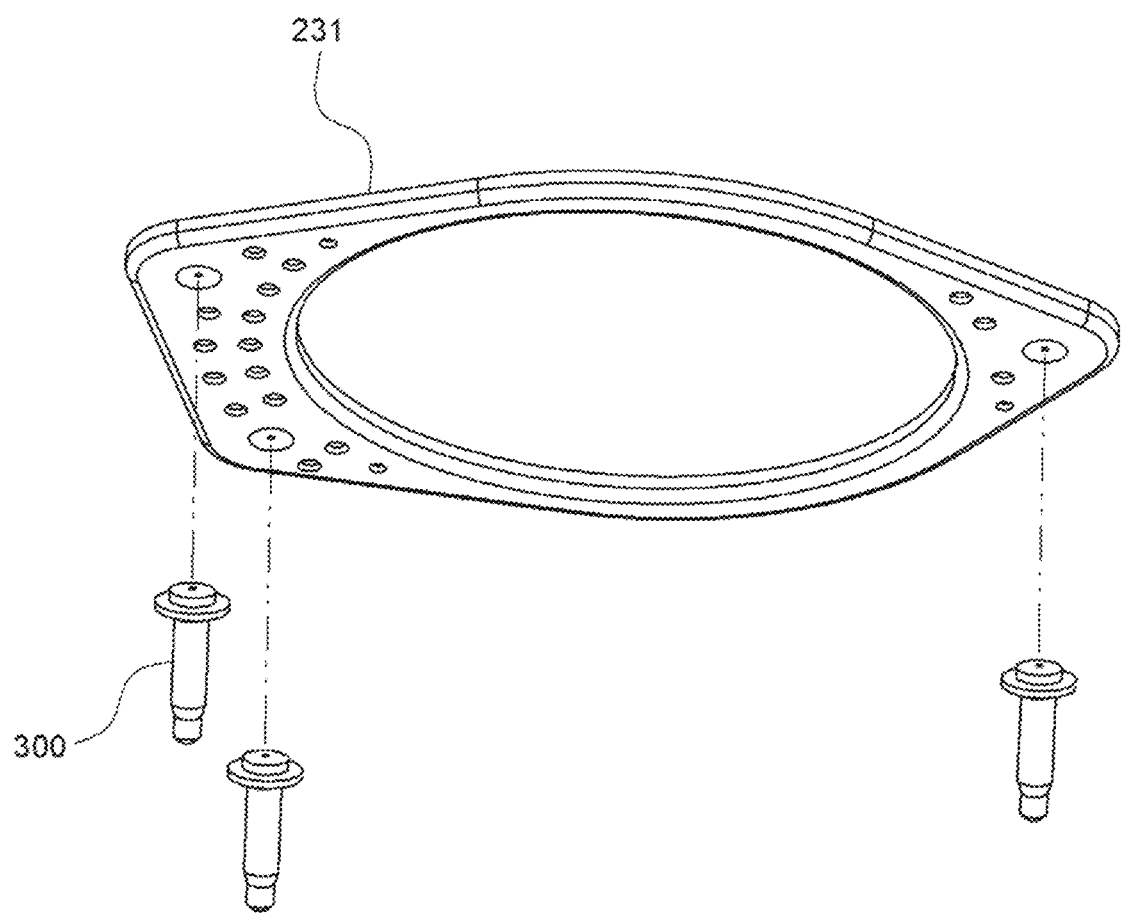
FIG. 7 is a view showing the coupling of an insert mold and a coupling member according to a preferred embodiment of the present disclosure.

FIG. 1 is an exploded cross-sectional view of a prior art steering shaft fixing bearing structure, FIG. 2 is a perspective view showing a dust cover according to a preferred embodiment of the present disclosure, FIG. 3 is a cross-sectional view showing the dust cover according to a preferred embodiment of the present disclosure, FIG. 4 is a view showing the coupling of a dust cover according to a preferred embodiment of the present disclosure, FIG. 5 is a cross-sectional view of a bearing race according to a preferred embodiment of the present disclosure, FIG. 6 is a view showing the coupling of the bearing race according to a preferred embodiment of the present disclosure, and FIG. 7 is a view showing the coupling of an insert mold and a coupling member according to a preferred embodiment of the present disclosure.

A dust cover, according to the present disclosure, is provided in a gap between a steering shaft and a dash panel so as to be penetrated by the steering shaft when the steering shaft provided under the steering wheel of a vehicle is installed through a vehicle frame.

Referring to FIG. 1 to FIG. 6, the dust cover according to the present disclosure includes a rolling part 100 and a seal part 200.

The dust cover includes the rolling part 100 coupled to a steering shaft S and the seal part 200 provided in a gap between the dash panel of a vehicle frame and the steering shaft S.

Herein, the rolling part 100 includes bearings 110, a bearing race 120 and fixing caps 130.

The bearings 110 are provided in one pair and coupled to the steering shaft S.

Herein, it is preferable that the bearing 110 is made of any one material of polyamide PA, polyethylene PE, polybuthylene terephthalate PBT, polyoxymethylene POM, and ethylene propylene diene monomer EPDM.

The bearing race 120 is coupled to surround the one pair of bearings 110 and has a concave groove part 121 formed along the outer circumferential surface thereof.

The fixing caps 130 are forcedly inserted into the bearing race 120 through the both sides of an opening by interference fitting so as to fix the bearings 110.

In addition, the bearing race 120 has inner stepped portions 124-1 formed on the inner circumferential surface 124 thereof such that the one pair of bearings 110 are provided on the inner stepped portions 124-1, wherein the inner stepped portions 124-1 are formed to be symmetrical.

Herein, the inner stepped portions 124-1 are symmetrical in the vertical direction with respect to the horizontal center axis of the bearing race 120 and thus the inner stepped portions 124-1 are respectively formed at the upper side and the lower side with respect to the horizontal center axis.

That is, the bearing race 120 is formed with a housing through-hole 123, through which the steering shaft S passes, such that the bearings 110 are provided on the center of the inner circumferential surface 124 of the housing through-hole portion 123 and the fixing caps 130 are forcedly inserted through the both sides of the opening of the housing through-hole 123.

In addition, the bearing race 120 and the fixing caps 130 have the same strength and the strength of the bearings 110 is greater than the strength of the bearing race 120 and the fixing caps 130.

Therefore, even if the fixing caps 130 are forcedly inserted into the bearing race 120, the bearing race 120 and the bearings 110 are not deformed. Furthermore, since the bearings 110 are pressure-fitted to be assembled, it is possible to prevent the deformation of the bearings 110, which has been caused by forced pressure fitting.

Therefore, noise and foreign matters, which may be introduced through the gap between the bearing race 120 and the bearings 110, can be blocked by preventing such deformation.

Meanwhile, the seal part 200 has the through-hole 270 so as to be coupled to the bearing race 120 and is provided with a coupling member 300 for coupling to the vehicle frame.

In addition, it is preferable that the seal part is made of any one of a thermoplastic resin material, ethylene propylene diene monomer EPDM, or polyurethane.

In addition, a protrusion part 271 is formed on the inner circumferential surface of the through hole 270, and the protrusion part 271 is coupled to the concave groove part 121 formed on the outer circumferential surface of the bearing race 120.

That is, the concave groove part 121 formed on the bearing race 120 and the protrusion part 271 formed on the inner circumferential surface of the through-hole 270 of the seal part 200 are coupled so as to prevent the introduction of foreign matters into the seal part 200 and the corrosion of the inside of the seal part 200.

In addition, the bearing race 120 is formed with coupling flanges 122 larger than the diameter of the concave groove part 121 and the coupling flanges 122 are symmetrically coupled to the through holes 135 of the upper protrusion part 210 and the lower protrusion part 220 so as to be positioned outside.

Meanwhile, the seal part 200 includes the plate 230, the side wall part 240, the flange wing part 250, the upper protrusion part 210 and the lower protrusion part 220.

The plate 230 forms the bottom of the seal part 200 and is fixed to one side of the vehicle frame by means of the coupling member 300, the side wall part 240 protrudes upward along the circumference of the plate 230, and the flange wing part 250 extends outward from the upper end of the side wall part 240 and is placed on the dash panel (not shown) of the vehicle frame.

In addition, the upper protrusion part 210 protrudes upward in a conical shape on the upper surface of the plate 230, and the lower protrusion part 220 protrudes downward in a conical shape on the lower surface of the plate 230.

An impact mitigation gap 280 is formed between the upper protrusion part 210 and the side wall part 240 and the through holes 270 coupled to the bearing race 120 are disposed in the upper protrusion part 210 and the lower protrusion part 220, respectively.

That is, the seal part 220 is fitted in the gap between the dash panel at the vehicle frame side and the steering shaft S, and the flange wing part 250 is held on the dash panel so as to support the seal part 220 and fixed to the vehicle frame side by the coupling member 300 coupled to the plate 230.

Therefore, the dust cover according to the present disclosure can be installed firmly on the vehicle frame more than that according to the structure of the prior art and is improved in mobility with respect to the vibration or movement of the steering shaft S since the cross-sectional area thereof is formed to be wider and the impact mitigation gap 280 is provided, thereby exhibiting excellent durability against the deformation of the seal part 200.

In addition, since the bearing races 120 having the one pair of bearings 110 are coupled to the through-holes 270 formed in the upper protrusion part 210 and the lower protrusion part 220, the steering shaft S can be stably supported owing to the structure, in which each one pair of bearings support the steering shaft S at one side and the other side of the steering shaft S.

Meanwhile, the central axis of the through hole 270 formed in the upper protrusion part 210 and the central axis of the through hole 270 formed in the lower protrusion part 220 coincide with the central axis of the steering shaft S each other.

Furthermore, since the central axes are formed at a certain angle with respect to the plane of the vehicle frame such that the central axis of the steering shaft S is inclined at the certain angle with respect to the plane of the vehicle frame.

In addition, a long portion 211 having a long length is formed on the inclined surface of the upper protrusion part 210, a long portion 221 having a long length is formed on the inclined surface of the lower protrusion part 220, and the long portion 211 of the upper protrusion part 210 and the long portion 221 of the lower protrusion part 220 are provided to face each other.

Furthermore, the long portions 211, 221 have annular wrinkle parts 212, 222 formed to be concave or formed to convexly project so as to prevent the vibration or impact transmitted to the steering shaft, thereby preventing damage.

In addition, the inside of the upper protrusion part 210 and the lower protrusion part 220 is empty and a protrusion pin 260 is further included protruding from the long portion 221 of the lower protrusion part 220 so as to face the outer circumferential surface of the long portion 221.

Therefore, when assembling the seal part 200 to the vehicle frame, an operator can easily adjust the position of the seal part 200 by means of the protrusion pin 260, In addition, the seal part 200 is formed integrally as a single component, which is easier to mount than the conventional structure to be assembled with parts provided at the engine room side and the interior space side of the vehicle, respectively.

Meanwhile, an insert mold 231 is provided to be inserted into the plate 230, and it is preferable that the mold 231 is made of any one of aluminum, steel, or rubber.

In addition, as for the coupling members 300, a plurality of coupling members 300 are provided to protrude to the lower side of the plate 230.

That is, a plurality of coupling members 300 are formed to protrude along the outer circumference of the lower surface of the plate 230, and the seal part 200 is fixed to one side of the vehicle frame by the coupling members 300.

Herein, the coupling members 300 refer to members such as stud bolts, bolts, nuts, or the like.

In addition, when stud bolts or bolts are provided as the coupling members 300, the bolts having different lengths may be provided to facilitate assembling of the seal part 200 to the vehicle frame during the assembling.

Although the present disclosure has been described in detail with reference to specific embodiments thereof, it is to be understood that the same is by way of illustration and example only and the present disclosure is not limited thereto. Therefore, it would be apparent that variations and modifications can be made by those skilled in the art within the technical idea of the present disclosure.

All of the simple modifications and variations of the present disclosure fall within the scope of the present disclosure, and the specific scope of protection of the present disclosure will be apparent from the appended claims.

| [Explanation of reference numerals] | |
| --- | --- |
| 100: rolling part | 110: bearing |
| 120: bearing race 1 | 121: concave groove part |
| 122: coupling flange | 123: housing through-hole |
| 130: fixing cap | 200: seal part |
| 210: upper protrusion part | |
| 220: lower protrusion part | |
| 230: plate | 231: insert mold |
| 240: side wall part | 250: flange wing part |
| 260: protrusion pin | 270: through-hole |
| 300: coupling member | |

The invention claimed is:

1. In a dust cover through which a steering shaft passes when the steering shaft provided under the steering wheel of a vehicle is installed through a vehicle frame, the dust cover characterized in that the dust cover includes a rolling part (100) coupled to the steering shaft (S) and a seal part (200) provided in a gap between a dash panel of the vehicle frame and the steering shaft (S), the seal part (200) includes a plate (230) forming the bottom, an upper protrusion part (210) protruding upward in a conical shape on the upper surface of the plate (230), and a lower protrusion part (220) protruding downward in a conical shape on the lower surface of the plate (230), and a through-hole (270), to which the rolling part (100) is coupled, is disposed in each of the upper protrusion part (210) and the lower protrusion part (220), wherein the seal part (200) is characterized in that a long portion (211) having a long length is formed on an inclined surface of the upper protrusion part (210), a long portion (221) having a long length is formed on an inclined surface of the lower protrusion part (220), the long portion (211) of the upper protrusion part (210) and the long portion (221) of the lower protrusion part (220) are provided to face each other, the long portions (211, 221) have annular wrinkle parts (212, 222) formed to be concave or formed to convexly project, and the inside of the upper protrusion part (210) and the lower protrusion part (220) is empty, and wherein the seal part (200) includes a side wall part (240) protruding upward along the circumference of the plate (230), a flange wing part (250) extending outward from an upper end of the side wall part (240) so as to be placed on the dash panel of the vehicle frame, and an impact mitigation gap (280) formed between the upper protrusion part (210) and the side wall part (240).

2. The dust cover according to claim 1, wherein the seal part (200) further includes a protrusion pin (260) protruding from the long portion (221) of the lower protrusion part (220) so as to face the outer circumferential surface of the long portion (221).

3. The dust cover according to claim 2, wherein the seal part (200) is formed integrally.

4. The dust cover according to claim 1, wherein the rolling part (100) includes one pair of bearings (110) coupled to the steering shaft (S), one pair of bearing races (120) provided to surround the outer circumferential surfaces of the bearings (110), and ring-shaped fixing caps (130) provided on the bearing race (120) so as to fix the bearings (110).

5. The dust cover according to claim 4, wherein the fixing caps (130) are forcedly inserted into the bearing race (120) through the both sides of an opening by interference fitting so as to fix the bearings (110).

6. The dust cover according to claim 5, wherein the bearing race (120) has inner stepped portions (124-1) formed on the inner circumferential surface (124) of the bearing race (120) such that the one pair of bearings (110) are provided on the inner stepped portions (124-1), and the inner stepped portions (124-1) are formed to be vertically symmetrical with respect to the horizontal center axis (c) of the bearing race (120) and the inner stepped portions (124-1) are respectively formed at the upper side and the lower side with respect to the horizontal center axis (c).

\* \* \* \* \*